(12) United States Patent
DiPede

(10) Patent No.: US 7,887,900 B2
(45) Date of Patent: Feb. 15, 2011

(54) WATERPROOFING MEMBRANE FOR USE ON INCLINED SURFACES

(76) Inventor: Sandro DiPede, 410-130 Bridgeland Avenue, Toronto, ON (CA) M6A 1Z4

( * ) Notice: Subject to any disclaimer, the term of this patent is extended or adjusted under 35 U.S.C. 154(b) by 0 days.

(21) Appl. No.: 12/710,047

(22) Filed: Feb. 22, 2010

(65) Prior Publication Data
US 2010/0215924 A1 Aug. 26, 2010

Related U.S. Application Data

(63) Continuation of application No. 11/815,615, filed as application No. PCT/CA2006/000169 on Feb. 8, 2006, now abandoned.

(60) Provisional application No. 60/650,986, filed on Feb. 9, 2005.

(51) Int. Cl.
*B32B 5/16* (2006.01)
(52) U.S. Cl. .................. 428/147; 428/143; 427/280
(58) Field of Classification Search ............... 427/280; 428/143, 147
See application file for complete search history.

(56) References Cited

U.S. PATENT DOCUMENTS 6,159,583 A * 12/2000 Calkins .................. 428/195.1
6,509,084 B2 * 1/2003 Sturtevant et al. ........... 428/141
7,459,180 B2 * 12/2008 Hamdar et al. ............. 427/186

* cited by examiner

*Primary Examiner*—William P Watkins, III
(74) *Attorney, Agent, or Firm*—Woods Oviatt Gilman LLP

(57) ABSTRACT

The present invention provides a waterproofing membrane for use on inclined surfaces. The membrane is fabricated from one or more layers of flexible sheet material preferably consisting of woven or nonwoven synthetic polymers of polypropylene. The membrane has a top surface and a bottom surface, where the bottom surface is intended to face the inclined surface. A skid resistant pattern of polymer elements is applied to the top surface of the membrane. The polymer has a Tensile Modulus <15 MPa (ASTM D638, 23C, 50 mm/min), a Tensile Yield Elongation >50% (ASTM D638, 23C, 50 mm/min, and a Shore A Hardness (ASTM D2240, 23C, 0 sec)<90. In a preferred embodiment the polymer elements are made from polyvinyl chloride polymer with a Tensile Modulus <7 MPa (ASTM D638, 23C, 50 mm/min), a Tensile Yield Elongation >50% (ASTM D638, 23C, 50 mm/min, and a Shore A Hardness (ASTM D2240, 23C, 0 sec)<75. The pattern of polymer elements may be applied directly on the top surface of the membrane or produced on one side of a carrier sheet which is attached to the top surface of the membrane. Where a carrier sheet is utilized, the carrier sheet is comprised of woven or nonwoven materials selected from the group consisting of synthetic polymers of polyethylene (PE), polypropylene (PP), polyethyleneterephthalate (PET), nylon, or copolymers and blends thereof, as well as glass or cotton, or blends thereof. In a preferred embodiment the carrier sheet is comprised of woven or nonwoven polypropylene (PP) or polyethyleneterephthalate (PET).

35 Claims, 8 Drawing Sheets

WATERPROOFING MEMBRANE FOR USE ON INCLINED SURFACES

REFERENCE TO RELATED APPLICATION

This application is a continuation of prior filed application Ser. No. 11/815,615, filed Aug. 6, 2007 which is a national phase application of PCT/CA2006/000169 filed Feb. 8, 2006.

FIELD OF THE INVENTION

The present invention relates generally to a waterproofing membrane for use on inclined surfaces having a skid resistant pattern of discontinuous polymer elements applied to the top surface of the membrane. In particular the waterproofing membrane may be used as a roofing underlayment in steep slope roofing applications, where it functions as a secondary water shedding layer applied originally beneath the primary roofing cover such as composition shingles, tile, metal, cedar shake, and the like.

BACKGROUND OF THE INVENTION

In recent years, synthetic polymer waterproofing membrane materials have been introduced to the North American market to replace traditional bituminous asphalt tar/felt paper roofing underlayments in steep slope (>2:12 pitch vs. flat roof) roofing applications. These synthetic materials possess several advantages over the traditional asphalt paper such as greatly improved tensile and tear strength, reduced tendency to tear away from fasteners which delivers greater wind uplift resistance, impervious to water absorption and degradation, engineered to resist UV degradation under prolonged outdoor exposure, lack of any oils leaching out, drying and cracking, and much lower weight per unit area, which facilitates greatly improved handling, storage, and installation productivity.

Although synthetic roofing underlayments possess several significant advantages over traditional asphalt paper, they generally suffer from poor skid resistant properties, most especially under steep slope wet surface conditions. Most underlayments, regardless of their working surface and application pitch, are generally acceptable for use and safe in very dry, non dusty conditions. But as is the nature of roofing, very often the application surface can possess moisture in the form of water, mist, and dew, further referred to as "wet" conditions; in extreme conditions, snow and ice. Depending on the level of surface moisture, and roof pitch, most roofing installers will continue to work (albeit with much greater care and diligence) on the surface of asphalt tar paper, owing to its generally satisfactory performance in minor levels of surface wet conditions.

The greatly reduced coefficient of friction in wet conditions experienced by low skid resistant synthetic roofing underlayments is a significant limiting factor to their enjoying accelerated market penetration in North America as a product class. When this skid resistance factor is combined with their higher cost as compared to commodity asphalt felt paper, this is dual challenge to greater market acceptance. In addition to cost, a roofing applicator will not likely continue to use a product which has such high inherent safety risk issues, both for personal safety, and equally as important, for the securement of various objects temporarily loaded onto the roofing underlayment surface during roof installation (packages of shingles, roofing tiles, etc), which would result in serious safety hazards should they randomly fall from the rooftop surface. For this reason, synthetic polymer, mechanically attached roofing underlayments for the North American market have attempted to mitigate the safety issue by developing improved skid resistant surfaces.

In Europe, however, synthetic underlayments have been used for a longer period of time, are readily accepted, and enjoy a much higher market share in steep slope roofing. The safety issue, although similarly present, isn't as great a concern since the vast majority of steep slope roofing in Europe is done with nailed batten based tile systems, where the roofing applicator has many anchor points to secure to during installation and routine traffic. As well, the type of design used in European homes is different (warm roof) than generally found in North America (cold roof), and this has required the use of moisture breathable roofing membranes, of which engineered synthetics have largely satisfied this need (asphalt paper lacks the sufficient inherent breathability). Thus, an additional driving force is at play higher in Europe which is partly responsible for the enhanced growth and penetration of synthetic polymer underlayments in Europe. Therefore, one finds typically smooth surfaced synthetic roofing underlayments are readily used and accepted as replacements for asphalt paper.

There exist a great many commercially available steep slope roofing underlayments in the global marketplace, comprising both mechanically attached (breathable & non breathable) synthetics, as well as polymer surfaced self adhered bitumen based. All claim some level of skid resistance, but none produce superior or "good" or "excellent" performance as compared to typical asphalt paper under a wide variety of surface loading dynamics found in typical steep slope, wet surface conditions applications. (see Table 1)

TABLE 1

Roofing Underlayment Facer/Skid Resistance Comparison

| Company | Brand Name | Facer Type | Skid-Resistance[1] |
|---------|------------|------------|-------------------|
| Flexia | TRIFLEX 30 ™ | Smooth PP* Coating | Poor[2] |
| RKW | RoofTopGuard II ™ | Nonwoven PP | Poor |
| Kirsch | Sharksin ™ | Nonwoven PP | Poor |
| PGI/Fabrene | MATRIX-UL ™ | Nonwoven PP | Poor |
| InterWrap | TITANIUM-UDL ™ | PP Netting | Fair |
| Proctor | RoofShield ™ | Nonwoven PP | Poor |
| MFM | Ice Buster Foil ™ | Embossed PE** Film | Poor |
| PolyGlass | Polyprotector-UDL ™ | EVA Hot Melt Pattern | Poor |
| Tamko | Tile & Metal ™ | Blistered PE Film | Poor |
| Grace | Ice&Water Shield ™ | Hot Melt Adhesive Pattern | Poor |
| Carlisle | WIP 300 ™ | Polymer Granular Film | Poor |
| Carlisle | WIP 100 ™ | Embossed PE Film | Poor |
| ProtectoWrap[6] | RainProof ™ | Corrugated PE Film | Poor |

TABLE 1-continued

Roofing Underlayment Facer/Skid Resistance Comparison

| Company | Brand Name | Facer Type | Skid-Resistance[1] |
|---|---|---|---|
| Bakor | Blueksin ™ | Polymer Granular Film | Poor |
| Dupont | Tyvek SUPRO ™ | Embossed HDPE | Poor |
| Caplast | ValmexDivu-TopM170 ™ | Nonwoven PP | Poor |
| Dorken | Delta LUXX ™ | Nonwoven PP | Poor |
| Dorken | Delta MAXX ™ | Embossed Coating | Poor |
| Klober | PermoForte | Nonwoven PP | Poor |
| Silcart | Lamintek 18 ™ | Nonwoven PP | Poor |
| Various | 30# Asphalt Paper | Asphalt/Cellulose Fiber | Good |

*PP = Polypropylene Polymer
**PE = Polyethyelene Polymer
[1]As tested on a simulated 12:12 (45 degree) inclined wooden deck. Test procedure involves water mist spraying to produce a saturated wet top surface condition, followed by a 60 kg+ weight person wearing rubber soled footwear simulating repeated dynamic incline walking (similar to German Ramp Test DIN 51130 except fixed incline, with handrails, 23 C.)
[2]Ratings: a. Poor: very slippery b. Fair: generally slippery c. Good: intermittently slippery d. Excellent: difficult to induce slippage A review of the extensive prior art products found in Table 1 clearly indicates the current state of the art is significantly lacking in the availability of a "good" or "excellent" rated, polymer based skid resistant surface for steep slope, wet condition roofing underlayment applications vs. traditional 30# asphalt felt paper.

SUMMARY OF THE INVENTION

The present invention provides a waterproofing membrane for use on inclined surfaces. The membrane is fabricated from one or more layers of flexible sheet material preferably selected from one or more of the group consisting of woven or nonwoven synthetic polymers of polyethylene, polypropylene, polyethyleneterephthalate and nylon; metal, woven or nonwoven glass, and bituminous materials. The most preferred materials are woven or nonwoven polypropylene for mechanical properties, heat resistance, and cost. The membrane has a top surface and a bottom surface, where the bottom surface is intended to face the inclined surface. A skid resistant pattern of polymer elements is applied to the top surface of the membrane. The polymer has a Tensile Modulus <15 MPa (ASTM D638, 23C, 50 mm/min), a Tensile Yield Elongation >50% (ASTM D638, 23C, 50 mm/min, and a Shore A Hardness (ASTM D2240, 23C, 0 sec)<90. In a preferred embodiment the polymer elements are made from a material selected from the group comprising polyvinyl chloride, polyurethane, acrylic polymer, silicone polymer, thermoplastic elastomer, thermoplastic polyolefins, natural or synthetic rubbers, and blends or copolymers thereof. In a more preferred embodiment the polymer has a Tensile Modulus <7 MPa (ASTM D638, 23C, 50 mm/min), a Tensile Yield Elongation >50% (ASTM D638, 23C, 50 min/min, and a Shore A Hardness (ASTM D2240, 23C, 0 sec)<75. In a most preferred embodiment the polymer is polyvinyl chloride. The pattern of polymer elements may be applied directly on the top surface of the membrane or produced on one side of a carrier sheet which is attached to the top surface of the membrane. Where a carrier sheet is utilized, the carrier sheet is comprised of woven or nonwoven materials selected from the group consisting of synthetic polymers of polyethylene (PE), polypropylene (PP), polyethyleneterephthalate (PET), nylon, or copolymers and blends thereof, as well as glass or cotton, or blends thereof. In a preferred embodiment the carrier sheet is comprised of woven or nonwoven polypropylene (PP) or polyethyleneterephthalate (PET).

In a preferred embodiment the waterproofing membrane provides a substantially improved steep slope, wet surface skid resistant performance roofing underlayment, whilst overcoming many of the commercial, technical, production, and wide ranging application specific (i.e. roof slope, wet condition, loading dynamics, primary roofing material type) performance issues of the prior art products.

In another aspect the present invention provides method of applying a skid resistant pattern of polymer elements to a waterproofing membrane or carrier sheet. In the preferred embodiment the polymer elements are applied to carrier sheet of woven or nonwoven polypropylene (PP) or polyethyleneterephthalate (PET). A liquid polymer emulsion formulation, preferably containing polyvinyl chloride polymer, is applied at the desired coating weight and in a skid resistant pattern by means of actuated nozzles or a rotary screen transfer roll or other known extrusion coating methods such as slot die coating. The preferred method is by a rotary screen transfer roll. The unsolidfied liquid pattern on the waterproofing membrane or carrier sheet is then cured at an elevated temperature under controlled conditions of time and temperature. Where the exiting material is a carrier sheet with a skid resistant pattern of polymer elements on its top surface the carrier sheet is then optionally reinforced with a scrim and then attached to a waterproofing membrane made from one or more layers of flexible sheet material selected from one or more of the group consisting of woven or nonwoven synthetic polymers of polyethylene, polypropylene, polyethyleneterephthalate and nylon, or blends and copolymers thereof; metal, woven or nonwoven glass, and bituminous materials. In a preferred embodiment the waterproofing membrane is woven or nonwoven polypropylene (PP).

BRIEF DESCRIPTION OF THE DRAWINGS

Preferred embodiments of the invention are shown in the drawings, wherein:

FIG. 8B illustrates the interconnected mesh or grid pattern of FIG. 8 where the junction or nodal points may be further raised in height from the main interconnected pattern.

DETAILED DESCRIPTION OF THE PREFERRED EMBODIMENTS

Figure 1:
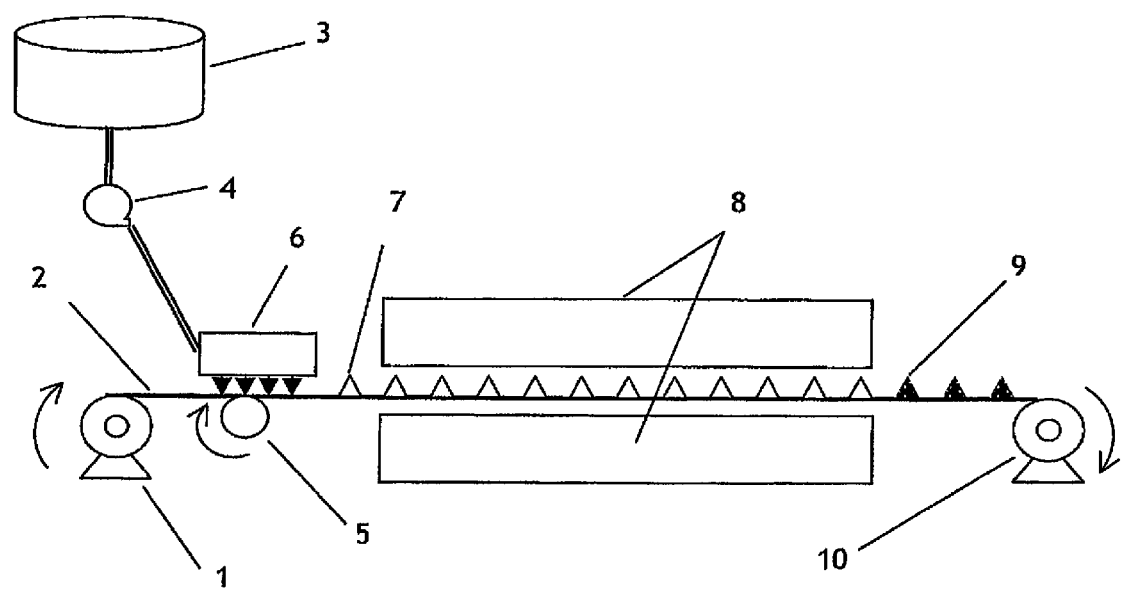
FIG. 1 illustrates one method of producing a skid resistant pattern of polymer elements on a waterproofing membrane or carrier sheet according to the present invention.

The novel membrane of this invention is a significant improvement over the prior roofing underlayment art as it relates to skid resistance particularly under the conditions of steep sloped, wet surface loading dynamics. By steep slope, this is generally referred to as slopes greater than 2:12 pitch, or 16.7 degrees; more preferably, above 5:12 pitch (23 degrees), and most preferably, above 8:12 pitch (39 degrees). By wet surface, this is meant to describe the conditions where any level of liquid moisture is present on the surface, either in the form of mist, dew, droplets, pools, or a saturated condition continuous layer. In other words, any liquid that is present between the surface of the underlayment and the bottom of the applicators foot or the bottom of a roof deck stored package, or primary roofing materials (e.g. roofing tiles) placed on the roof for temporary storage and future use. By roof loading dynamics, this is meant to indicate the mass of the load (roofer or inanimate object temporarily placed on the underlayment surface), the angle of and direction of load, the material type and coefficient of static and dynamic friction of the loading element, and the speed of load change. As used herein, the term "nonwoven" refers to a fabric that has a structure of individual fibers or filaments which are interlaid and entangled, but not in an identifiable repeating manner. Breathable is meant to refer to a moisture vapour - permeability >1.0 as measured in US Perms via ASTM E96A (23C/50% RH).

The measurement of coefficient of friction and skid resistance under pitched roof, wet condition, human, dynamic loading factor is an extremely complicated science, almost impossible to predict from theory, or to measure with instrumentation, or to confer actual field applicator skid resistance from laboratory simulated test conditions. Much of the skid resistant/anti-slip/COF (coefficient of friction) prior art relies on various ASTM or other scientifically recognized testing standards, but their ability to predict skid resistance is extremely limiting. Those skilled in the art realize it is almost impossible to accurately simulate via instrumentation, human applicator dynamics under steep slope, wet surface conditions, although the use of an English XL VIT has been shown to provide some level of correlation to wet surface skid resistance, and can be used as a tool in the development and evaluation of skid resistant surfaces. A much more practical, application simulating, and valid test is to evaluate the membrane under a pitched condition, simulating actual wet surface conditions, and with typical human factor loading dynamics achieved only by an actual typical roofer, using typical roofing shoes, and demonstrating typical traffic dynamics of angle of body load, center of mass, percentage of foot contact with surface, angle of foot contact, speed of motion, etc. Through repeated tests to thoroughly simulate real conditions and with the use of control materials of known skid resistance performance, the skid resistance performance of the present invention has been determined.

There exists an optimum balance between skid resistance performance, pattern design, and pattern basis weight/area (which directly effects cost). Beyond a certain pattern density, the surface reaches saturation, and reverts to almost "continuous smooth", and thus, wet surface skid resistance performance is severely reduced. At too low a pattern density and/or coating weight, there are insufficient numbers of anchoring points to generate sufficient skid resistance performance. At too large a pattern height above the surface, the membrane will produce a very large diameter roll for a given roll length, which significantly impacts packaging and transport efficiency, and end product installation productivity. In a preferred embodiment the polymer elements have a Tensile Modulus <7 MPa (ASTM D638, 23C, 50 mm/min, a Tensile Yield Elongation >50% (ASTM D638, 23C, 50 mm/min, and a Shore A Hardness (ASTM D2240, 23C, 0 sec)<75. Preferably the height of the polymer elements is between 0.02 mm to 1.0 mm and the height of individual polymer elements vary within the range of 0.02 mm to 1.0 mm. The pattern of polymer elements can be discontinuous or interconnected, wholly or in part, to form the final pattern. The pattern is preferably is comprised of distinct polymer regions having a density range of between 25 per 100 cm$^2$ to 2500 per cm$^2$. The pattern of polymer elements preferably has a surface application weight of between 5 grams/m$^2$ and 50 grams/m$^2$ and in an embodiment the pattern of polymer elements has a surface application weight of between 10 gams/m$^2$ and 30 grams/m$^2$. In another embodiment the membrane has an exposed top surface solar reflectance >25% at 500 nm wavelength as measured by ASTM #903-96 on a black background.

In one embodiment, the present invention utilizes a soft, resilient, low modulus, high tensile strength & high elongation, polymer surface pattern on the top surface of a synthetic polymer waterproofing membrane layer manufactured by high production output, low converting cost means. The bottom surface of the membrane layer is intended to be applied facing a roof deck. The polymer surface can be produced by a relatively simple method at high production efficiencies. More specifically, by the use of room temperature extruded polymer elements in the form of an emulsion, applied onto a wide width synthetic polymer waterproofing membrane layer. In a preferred embodiment, the polymer elements are first applied to a carrier surface, preferably nonwoven fibrous (natural, polymeric), simultaneously forming a distinct imprinted skid resistant pattern, followed by heat curing to render a solidified, high COF, soft, low modulus, resilient, very tough, extremely well bonded, UV and high and low temp resistant skid resistant material. The carrier layer, where it is a waterproofing membrane, may comprise the finished engineered product substrate, or function as a transitory skid resistant carrier surface, which is then subsequently attached to a wide width reinforcing woven or non-woven or other reinforced or bitumen based adhesive primary waterproofing membrane layer (breathable or non breathable, mechanically attached or rubberized adhesive underlayment) by means of adhesive, ultrasonic, mechanical, thermal bonding, or polymer extrusion coating, or other means known in the art. The waterproofing membrane layer prevents bulk water transfer to the roof deck, but may be designed to allow sufficient moisture vapour transmission through the membrane as in breathable roofing underlayments.

In a preferred embodiment the invention largely overcomes the inherent steep slope, wet surface, skid resistant limitations of prior art materials that possess inherently low COF host surface materials, and/or relatively smooth and/or, and/or relatively hard polymer surfaces, and/or inferior surface skid resistant topology physics. It also overcomes several of the technical, production, and commercial difficulties of producing skid resistant polymer surfaces using more complex, application limiting (e.g. low softening point hot melts), and costly hot melt production techniques at the speeds and wide membrane widths needed for commercial low unit cost production.

Table 2 illustrates select mechanical/thermal properties of a select range of polymers known in the prior art as having been used to generate roofing underlayment skid-resistance.

TABLE 2

Skid Resistant Polymer Properties

| Polymer Chemistry | Tensile Modulus (MPa)[1] | Tensile Yield Strength[2] (MPa) | Tensile Yield Elongation[3] (%) | Softening Point[4] (C) | Shore A Hardness[5] |
|---|---|---|---|---|---|
| PP | 1500 | 35 | 10 | 165 | D70 |
| HDPE | 1000 | 30 | 15 | 135 | D60 |
| LDPE | 300 | 10 | 15 | 95 | D50 |
| EVA[6] | 25 | 8 | 9 | 60 | A85 |
| EVA HotMelt[7] | 15 | 1.5 | 4 | 45 | A75 |

[1]ASTM D638, 23 C., 20 in/min
[2]ASTM D638, 23 C., 20 in/min
[3]ASTM D638, 23 C., 20 in/min
[4]ASTM D1525
[5]ASTM D2240/23 C./0 seconds
[6]Dupont EVA Elvax 28% VA
[7]National Starch EVA Hot Melt #34-5227

A review of Table 2 in combination with Table 1 indicates that a high modulus and high hardness (e.g. PP or PE coating) combination, or low modulus, low tensile yield strength & elongation, low softening point combination (e.g. EVA hot melts) are related to inferior steep slope, wet surface condition skid resistance. The surface property of skid resistance performance via comparative property analysis is not intuitively obvious for the specific scope of this invention to those skilled in the art. High hardness and modulus generally produce a lower COF and non-resilient material for reacting to the complicated roofing loading dynamics required for skid resistance. Polymers that are hard and don't yield and have low COF (e.g. PP & PE), generally don't perform well in skid resistance under wet conditions. One could classify these materials as "hard and slick". This is generally validated by the ratings of prior art materials in Table 1.

On the other hand, polymers (e.g. EVA hot melts) that are much softer, but have lower modulus, lower tensile yield strength & elongation, and lower temperature resistance, also don't perform well due to challenges with primary surface adhesion, and low shear strength under high shear loading conditions. This combination of polymer properties grouping will tend to have lower substrate adhesion strength, lower skid resistant pattern tensile and shear strength to resist gross shear failure under roof loading dynamics, and severely reduced skid resistance performance under elevated temperature conditions. One could classify these as "soft and weak". In addition, since hot melt adhesives are somewhat tacky, the adhesives have a tendency to become coated with dust, wood particles, and other fine airborne particulates over time. Once coated with such particles, the adhesives begin to lose much of their limited anti-slip characteristics. Furthermore, hot melt adhesives are expensive. Hot melt adhesives tend to contaminate the machines that are used to produce the coating. The hot melt surface skid resistance prior art also requires costly and sophisticated application techniques to produce sophisticated surface topical skid resistance physics (e.g. complex patterns requiring complex dies), and are generally production width (i.e. narrower width & higher unit cost), and slower speed (i.e. higher unit cost) limited.

By utilizing a low elastic modulus, high tensile and high elongation, soft rubbery polymers, they are more readily compressible and elastically deformable under load without resultant gross shear failure. This unique property is also known as "resiliency", or the ability to elastically deform to high elongation without yield or failure. More particularly, when compressed by another surface, such as when being loaded by a roofer's shoe, the polymer deforms and tightly conforms to the topography of load stress patterns, which significantly increases the apparent coefficient of friction between the polymer surface and the surface loading element. Essentially, when compressed and/or sheared, the polymer conforms to the surface and provides the sole of the shoe with enhanced traction by redistributing the load more uniformly without shear failure or slippage. But the preferred polymer must deform to some degree, but yet have sufficient resiliency to not exhibit shear failure away from underneath the roofer shoe or other loading elements, which would initiate gross dynamic slippage. Of particular advantage, the polymer formulations and method of processing of the present invention are low modulus, high shear strength, high tensile yield elongation, resilient, and have relatively high coefficient of friction without being as tacky, sticky, or possessing low yield/ shear strengths as hot melt adhesives used in the past (i.e. "soft and weak").

Considering the steep slope, wet condition skid resistance properties in Table 1, and combining the physical property analysis of Table 2, whilst considering the technical, production, and commercial issues of producing commercially viable and functionally useful products using conventional polymers (e.g. PE, PP, LDPE, hot melts), it is disclosed the novel use of liquid polymer emulsions, applied at room temperature very easily and at low capital cost, and solidified (cured) at elevated temperatures on low cost, wide width production machinery to produce an "excellent" rated steep slope, wet surface condition roofing underlayment surface.

One preferred steep slope, wet condition roofing underlayment polymer system that would deliver the above mentioned novel performance, and at commercially low cost, and high production efficiencies is plasticized PVC (Poly Vinyl Chloride) polymer. PVC is a high volume commodity polymer with excellent UV properties, and known in the art for tremendous versatility in processing method and finished property performance via specialized additives and plasticization in both liquid and molten processing applications.

TABLE 3

Skid Resistant Polymer Properties
(as per Table 2 ASTM standards)

| Polymer Chemistry | Tensile Modulus (MPa) | Tensile Yield Strength (MPa) | Tensile Yield Elongation (%) | Shore A Hardness |
|---|---|---|---|---|
| PVC[1] | 10 | 10 | 150 | A70 |

[1]Solidified, Plasticized PVC Emulsion Formulation

Review of Table 3 illustrates that a plasticized, heat cured PVC liquid polymer emulsion can produce a surface polymer for steep slope, wet condition roofing underlayment applications with a unique combination of modulus, yield strength and elongation, and hardness. The novel properties can result in a soft and resilient polymer surface that has very high yield strength and temperature resistance; more generally in between relatively hard and low COF polymers, and softer low strength olefin hot melts, and might be classified as "soft and strong".

Other polymer emulsion formulations could be used such as polyurethanes, acrylics, and natural or synthetic rubber thermoplastic elastomers, as long as they generally fall in a range of property values referenced above. Namely, a shore A hardness <90 (ASTM D2240, 23C, 0 sec), a tensile modulus <15 MPa (ASTM D638, 23C, 50 mm/min), and a tensile yield elongation >50% (ASTM D638, 23C, 50 mm/min). In a preferred embodiment the polymer formulation has a Tensile Modulus <7 MPa (ASTM D638, 23C, 50 mm/min), a Tensile Yield Elongation >50% (ASTM D638, 23C, 50 mm/min, and a Shore A Hardness (ASTM D2240, 23C, 0 sec)<75.

The use of a nonwoven fabric carrier surface is preferred over smooth impervious materials such as films (e.g. some of the PE film surfaces in the prior art), since the interfacial adhesive strength between cured polymer and carrier surface is critical for steep slope, wet surface, roof loading dynamic roofing skid resistance. During initial polymer emulsion application/deposition, the liquid emulsion will tend to flow down and into the random fibers and gain significant "mechanical" attachment when cured, even between generally non compatible polymers. The emulsion effectively cures around individual fibers, thus locking itself mechanically into the carrier fabric material.

FIG. 1 illustrates one method of making one embodiment of applying a skid resistant pattern of polymer elements to a waterproofing membrane or carrier sheet according to the present invention. A large jumbo length roll of waterproofing membrane or nonwoven surface carrier 2, preferably a woven or nonwoven polypropylene (PP) or polyethyleneterephthalate (PET) is spooled off a payoff dispenser 1. The carrier, is unwound from the payoff dispenser by way of downstream pulling via rewinder 10. Those skilled in the art would realize that the necessary speed control technology would be required to produce a uniform tension, surface coated end product. Room temperature, pre-blended, aerated, and moisture eliminated, liquid polymer emulsion formulation, preferably polyvinyl chloride polymer based, stored in container 3 is pumped into the pattern applicator head 6, by means of pump 4. Counter roller 5 is used to ensure the distance between the applicator head and substrate is constant and precise. Applicator head 6, operated at room temperature, controls the pattern design and applied coating weight by means of actuated nozzles, or alternatively, a rotary transfer roll device, or other known extrusion coating methods such as slot die coating. In preferred embodiment a rotary screen transfer roll is utilized. The unsolidfied liquid pattern 7 is then transported into an elevated temperature heat curing oven 8, under controlled conditions of time and temperature, to ensure the necessary emulsion curing takes place before the coating exits the oven 8 in the final 9 cured form. The exiting material is a carrier with a skid resistant pattern of polymer elements and/or novel waterproofing membrane useful as a steep slope, wet surface condition, "excellent rated" roofing underlayment depending on the carrier design and manufacturing process, and end product property application. The cured surface pattern coated membrane/carrier is then rewound into jumbo rolls for further downstream processing. In the preferred embodiment the carrier sheet is then optionally reinforced with a scrim and then attached to a waterproofing membrane made from one or more layers of flexible sheet material selected from one or more of the group consisting of woven or nonwoven synthetic polymers of polyethylene, polypropylene, polyethyleneterephthalate and nylon, or blends and copolymers thereof; metal, woven or nonwoven glass, and bituminous materials. In a preferred embodiment the waterproofing membrane is woven or nonwoven polypropylene (PP). The disclosed applicator head and oven combination system is a very simple, low cost, high speed, and wide width capable production method.

Figure 2:
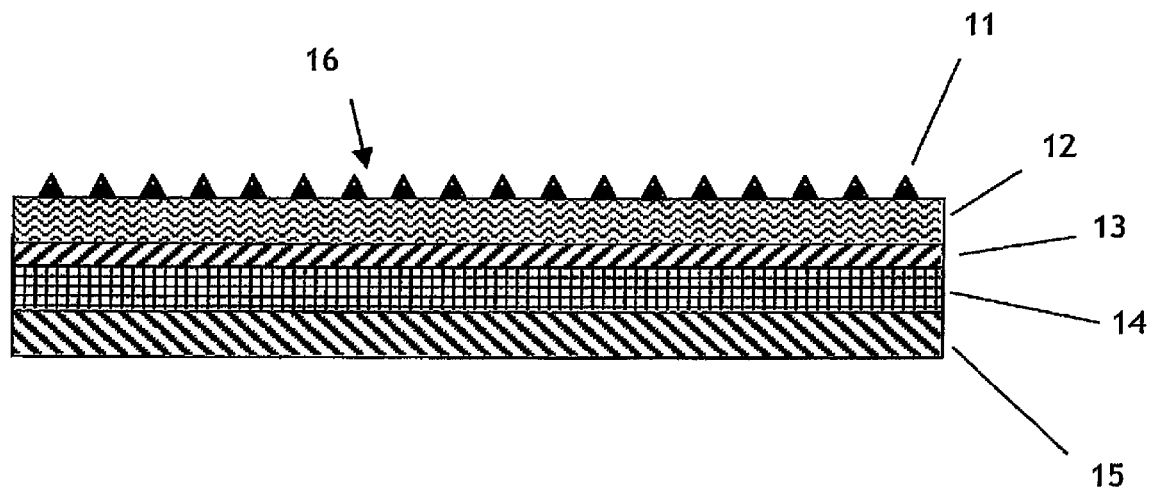
FIG. 2 illustrates an embodiment of a waterproofing membrane according to the present invention for use as a steep slope, wet condition skid resistant roofing underlayment in a non-breathable, mechanically attached finished product form, using a woven reinforcement.

FIG. 2 illustrates one embodiment of a waterproofing membrane 16 fabricated from one or more layers of flexible sheet material according to the present invention for use as a steep slope, wet condition skid resistant roofing underlayment in a non-breathable, mechanically attached finished product form, using a woven reinforcement. A non woven carrier sheet 12 forms the top layer and has a skid resistant pattern of polymer elements 11 applied to one side, preferably produced via the method described in FIG. 1. The carrier sheet 12 is extrusion coated laminated onto an inner woven scrim 14 (via coating lamination layer 13), which provides the strength of reinforcement required to withstand tearing loads on a typical roofing installation application, from loading and stretching dynamics and exposed weather elements such as high wind uplift. This woven/surface combination precursor is then further extrusion coated on the bottom side with preferably a high COF (>0.5 via English XL VIT under dry conditions) anti-slip coating 15 of PP, PE, EVA, or EMA, or blends and copolymers thereof, in the case of an olefin based woven for compatibility, to render the surface anti-slip on the deck surface interface prior to the underlayment being fastened by the applicator, thus reducing further underlayment underside/deck slippage.

Figure 3:
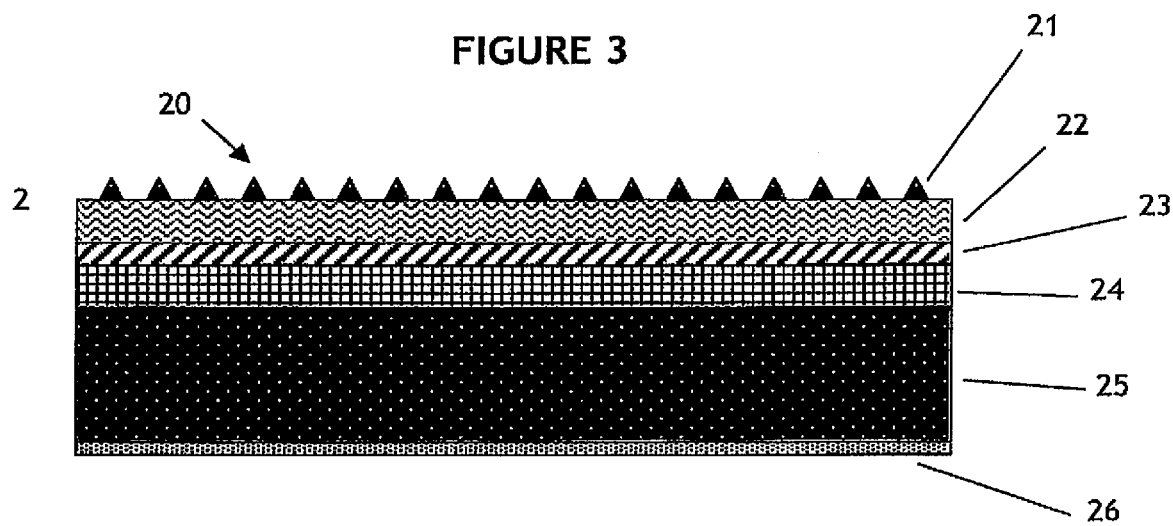
FIG. 3 illustrates another embodiment of a waterproofing membrane according to the present invention having a reinforced carrier sheet attached to a non-breathable, self adhering bitumen layer.

FIG. 3 illustrates another embodiment of a waterproofing membrane 20 fabricated from one or more layers of flexible sheet material according to the present invention for use as a steep slope, wet condition skid resistant roofing underlayment possessing a self adhering adhesive layer (typically rubber modified bitumen) for use in extreme waterproofing applications, such as ice damming commonly found in pitched roof eaves and valleys. A carrier layer 22 having a skid resistant pattern of polymer elements 21 applied to one side preferably produced via the method described in FIG. 1. The carrier sheet 22 is extrusion coated laminated onto an inner woven scrim 24 (via coating lamination layer 23), which provides the strength of reinforcement required to withstand tearing loads on a typical roofing installation application, from loading and stretching dynamics, and exposed weather elements such as high wind uplift. The reinforced carrier sheet (layers 21-24) is further processed on a bitumen coating machine which applies a layer of self adhesive bitumen 25 generally known in the art, and then finished with the application of a release liner 26, generally known in the art, comprised of siliconized substrates such as paper, PP, PET, or LDPE film, or the like.

Figure 4:
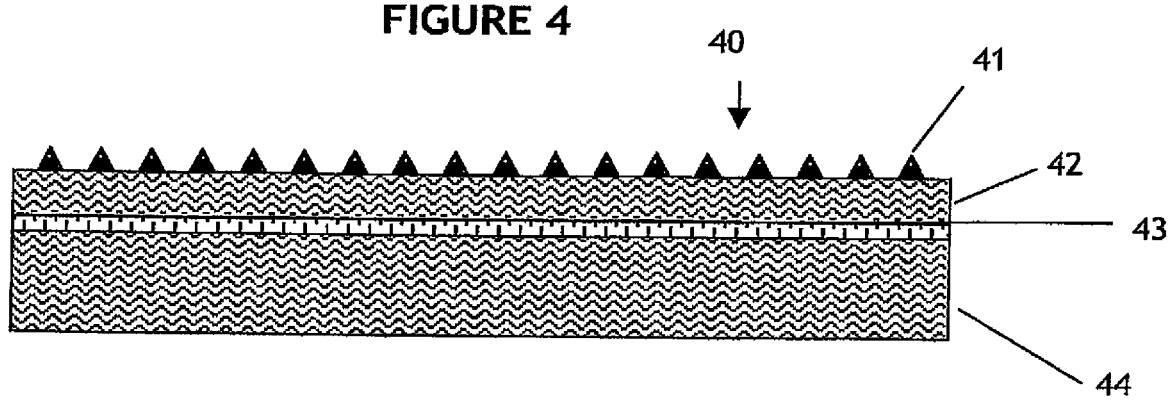
FIG. 4 illustrates another embodiment of a finished, generally breathable (>1.0 US Perms permeability, ASTM E96A, 23C/50% RH), waterproofing membrane according to the present invention using a breathable film and nonwoven reinforcement.

FIG. 4 illustrates another embodiment of a finished, generally breathable (>1.0 US Perms permeability, ASTM E96A, 23C/50% RH), waterproofing membrane 40 fabricated from one or more layers of flexible sheet material according to the present invention for use as a steep slope, wet surface condition roofing underlayment with an excellent-rated skid resistant performance. A nonwoven carrier sheet 42 which is generally highly moisture vapour breathable has a skid resistant pattern of polymer elements 41 applied to one side. The carrier sheet 42 is thermally, ultrasonic, intermittent extrusion coated, or adhesive laminated with a generally breathable polyethylene, polypropylene, polyurethane, or other known breathable film 43 as providing the desired breathability and adhesion properties to the substrate components. This precursor is then once again bonded either ultrasonically, thermally (heat and pressure), or with adhesive or other known means which does not impede breathability, to an underside reinforcing, breathable substrate 44 such as, for example, a higher basis weight/strength generally breathable woven or nonwoven. Alternatively, an open scrim style woven scrim can be inserted between the breathable film 43 and underside breathable substrate 44 during lamination to provide higher reinforcement properties, at lower overall cost.

Figure 5:
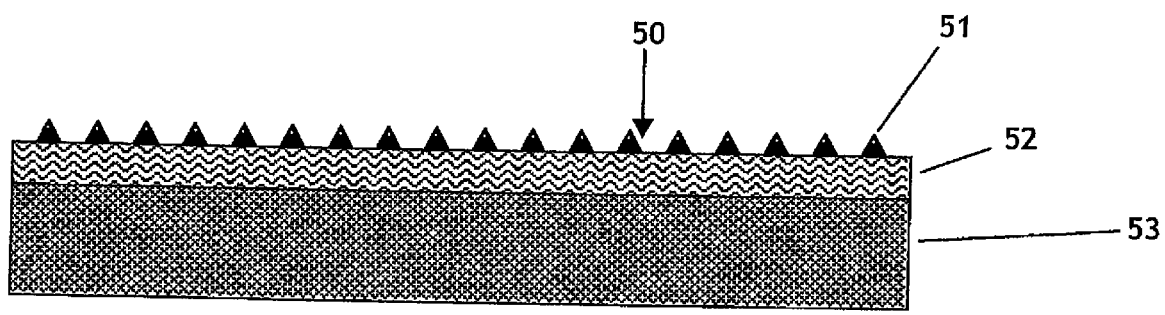
FIG. 5 illustrates another embodiment of a finished, generally breathable (>1.0 US Perms permeability, ASTM E96A, 23C/50% RH), waterproofing membrane according to the present invention.

FIG. 5 illustrates another embodiment of a finished, generally breathable (>1.0 US Perms permeability, ASTM E96A, 23C/50% RH), waterproofing membrane 50 for use as a steep slope, wet surface condition roofing underlayment with an excellent-rated skid resistant performance. A nonwoven carrier sheet 52, which is which is generally highly moisture vapour breathable, possesses a skid resistant pattern of polymer elements 51 applied to one side. The carrier sheet 52 is thermally, ultrasonic, intermittent extrusion coated, or adhesive laminated with a generally breathable polyethylene, polypropylene, polyurethane, or other known breathable nonwoven reinforcing layer 53.

Figure 6:
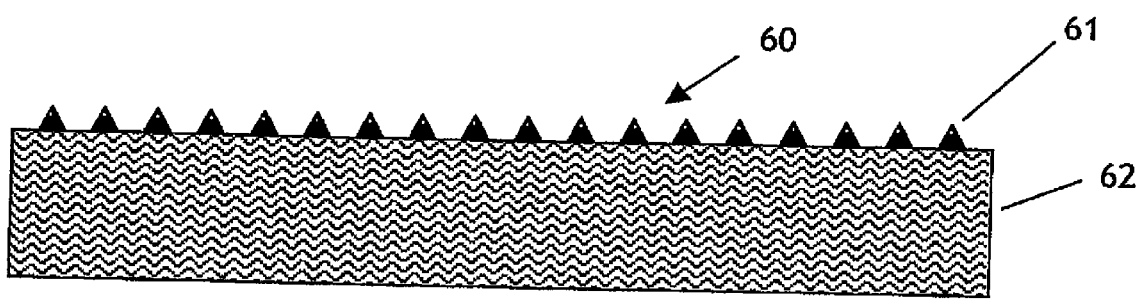
FIG. 6 illustrates another embodiment of a finished, generally breathable (>1.0 US Perms permeability, ASTM E96A, 23C/50% RH), waterproofing membrane according to the present invention.

FIG. 6 illustrates another embodiment of a finished, generally waterproofing membrane 60 for use as a steep slope, wet surface condition roofing underlayment with an excellent-rated skid resistant performance. A skid resistant pattern of polymer elements 61 applied to one side of waterproofing membrane 62.

Figure 7:
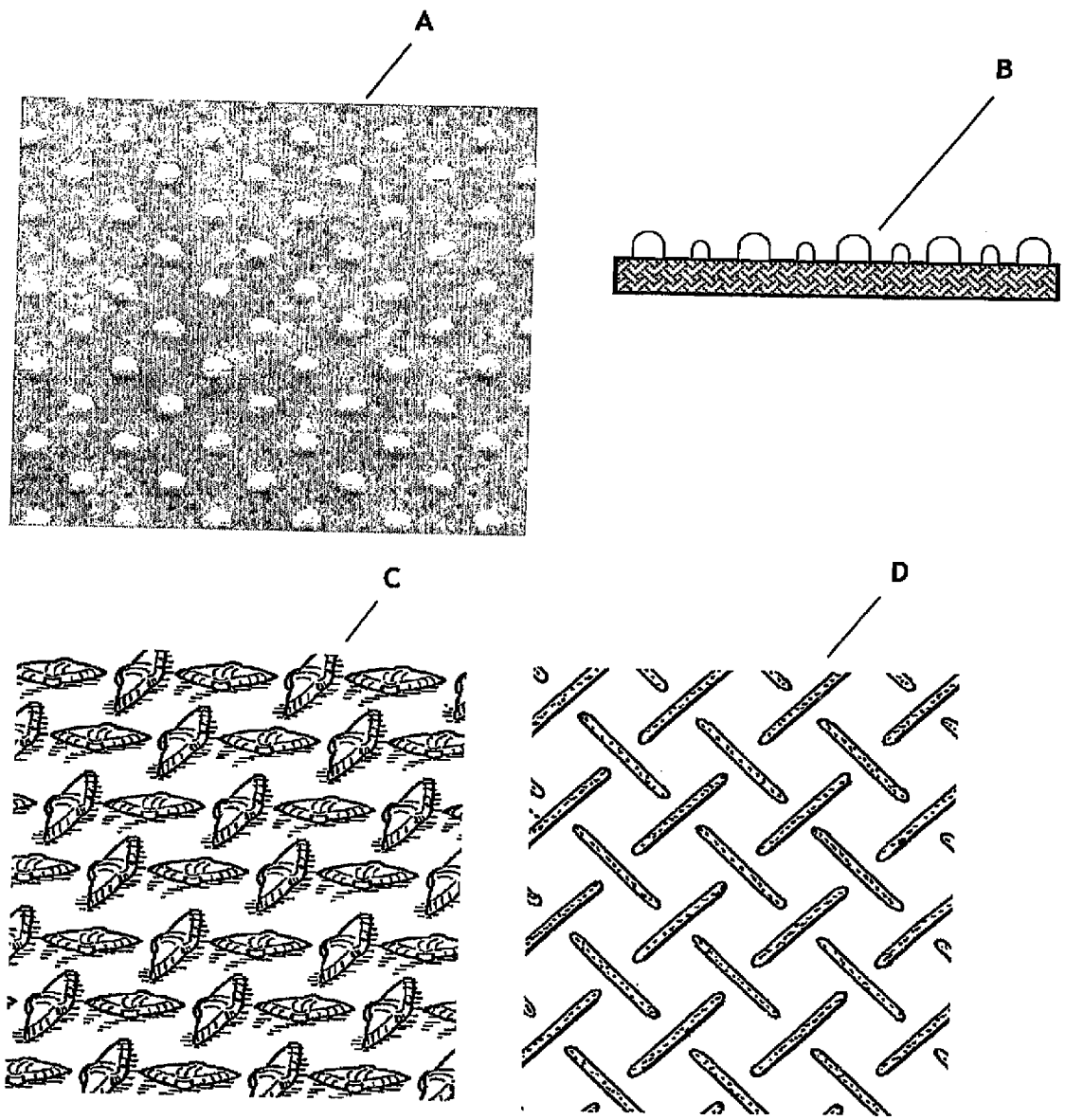
FIGS. 7A-D illustrate various skid resistant patterns of polymer elements on nonwoven surface carrier layer according to the present invention.
Figure 8:
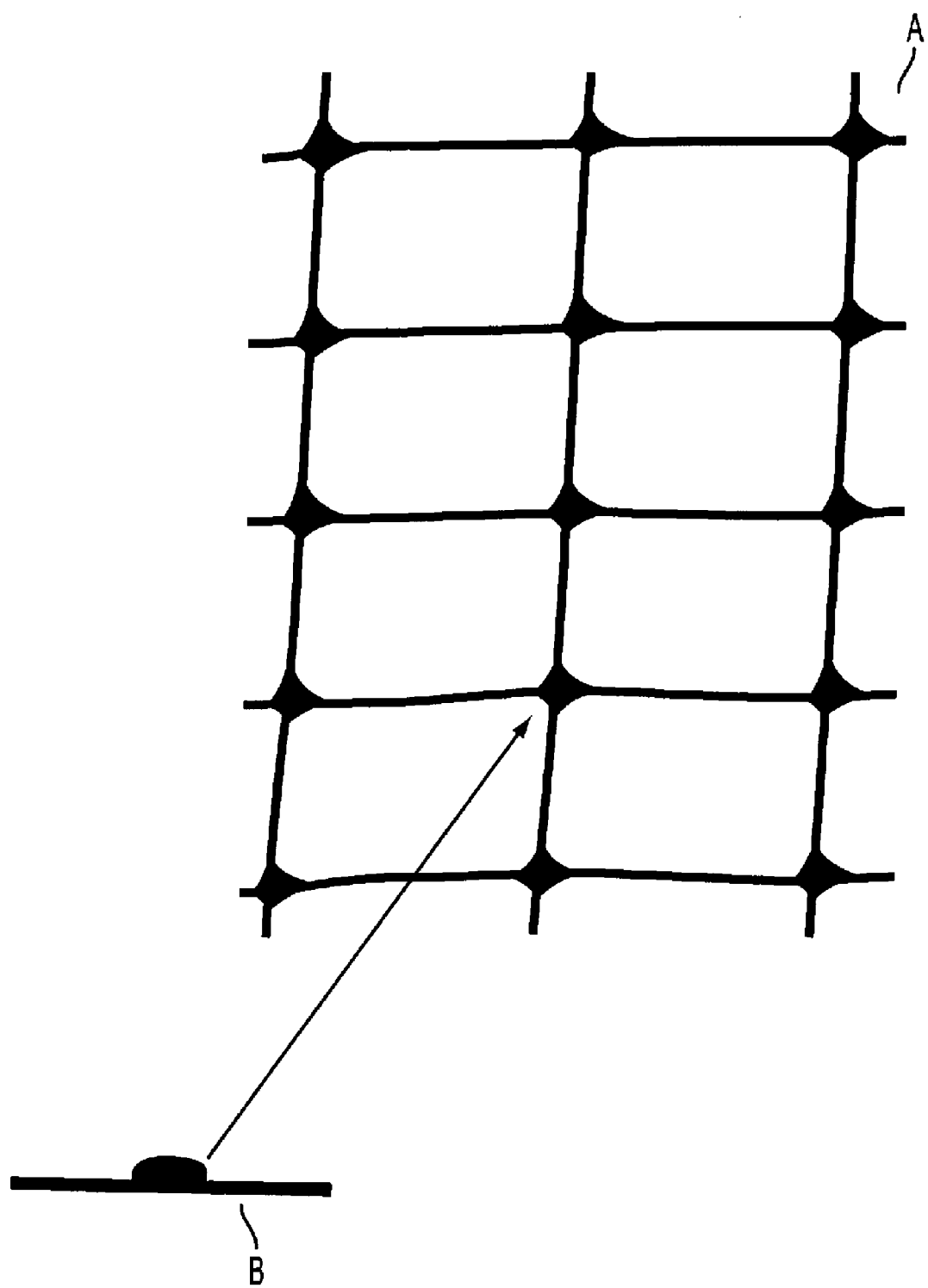
FIG. 8 illustrates an interconnected mesh or grid pattern that may be used as a skid resistant pattern of polymer elements according to the present invention.

FIGS. 7A-D illustrate several preferred skid-resistant raised profile, repeat patterns produced by the method of FIG. 1, utilizing a nonwoven carrier sheet, and possessing the preferred solidified PVC emulsion pattern coating. FIG. 7A represents a simple uniform conical dot pattern surface, with staggered rows. FIG. 7B represents a side view of a pattern similar to FIG. 7A, except comprised of alternating small and large dots, which provides a more complex steep slope surface loading interaction. FIG. 7C represents a crosshatch design with skid resistant elements in both the slope direction, and transverse to it, thus providing an additional complex skid resistant loading dynamic. FIG. 7D is an iteration of FIG. 7C. FIG. 8 is an interconnected mesh or grid pattern, where the junction or nodal points may be further raised in height from the main interconnected pattern as shown in FIG. 8B.

Example 1

Mechanically Attached, Non Breathable Roofing Underlayment

A liquid PVC emulsion formulation containing emulsion grade PVC resin (100 parts), DINP plasticizer (100 parts), Calcium Carbonate (10 parts), Epoxidised Soybean Oil (3 parts) and Calcium Zinc Stabilizer (2 parts) was batch mixed to uniformity at room temperature, whilst eliminating entrapped air and moisture, to emulate the final cured PVC resin properties in Table 3. The mixture was processed, as per FIG. 1, with the pattern being applied to the carrier at room temperature at a line speed of 150 m/min, at a curing oven temperature of 130° C. for 30 seconds cure time, on a 30 gsm nonwoven PP surface carrier sheet, to produce a final cured emulsion coating weight of 30 gsm. A PVC dot pattern as shown in FIG. 7A was produced, possessing 15 dots/inch 2 (232 dots/100 cm$^2$), and average dot height of 0.3 mm (as measured from surface of carrier to top of dot). The cured PVC dots possessed high shear strength, low modulus, and high resiliency. This skid-resistant carrier sheet was then extrusion coated laminated (with 25 gsm PP coating layer) onto an 100 gsm woven PP scrim serving as reinforcement, and then further processed by the application of a high COF skid-resistant EVA bottom-side extrusion coating layer (25 gsm) to produce a finished, generally non-breathable, mechanically attached steep slope roofing underlayment as shown in FIG. 2.

The skid-resistant underlayment produced in Example 1 was then mechanically attached to the testing apparatus referenced in Table 1 via plastic capped roofing nails. The surface was saturation wetted using a fine nozzle spray mist water bottle, as per the procedure noted in Table 1. A 75 kg roofer, wearing test procedure rubber soled safety footwear, simulated typical applicator inclined walking loading dynamics. The test procedure involves the roofer slowly attempting to walk up the incline on the balls of the foot, whilst holding handrails for security, and assessing the degree of skid resistance of the underlayment surface. This is repeated several times, each time re-saturating the surface, at various foot angles and speed of foot loading to determine the skid resistance rating as per Table 1. The same procedure was undertaken on control ASTM 30# asphalt felt paper, and the roofing underlayment with equivalent carrier sheet, yet no skid resistant pattern. The test result for the roofing underlayment of Example 1 was a skid resistant rating of "excellent". A typical package of unopened polyethylene over-wrapped roofing shingles was loaded onto the same apparatus under wet surface conditions, and left overnight. The next day the package was observed to have not moved from it's original placement. A stack of 10 flat cement roofing tiles was placed on the underlayment, surface attached to a separate 5:12 pitch steep slope apparatus as per USA Miami-Dade TAS-104-95 building code (except performed at room temperature) and left overnight. The next day, the tiles were observed to have not moved from their original placement location. Additionally, the roofing underlayment skid resistant surface in Example 1 was tested for Coefficient of Friction (COF) using an English XL SlipMeter under saturated wet conditions on a horizontal surface. A COF >0.5 is considered safe, but preferably, a COF >0.7 is considered excellent skid resistance in wet conditions. The underlayment in Example 1 recorded a COF of 1.0. This same roofing underlayment produced a US PERM rating of 0.14, and is considered non-breathable.

Using a heated mold, a cast sheet 0.30 mm thick was produced with the same liquid emulsion formulation and processing conditions as Example 1. The resulting properties of this cast sheet are shown in Table 4.

TABLE 4

| | Skid Resistant Polymer Properties: Example 1 (as per Table 2 ASTM standards) | | | |
|---|---|---|---|---|
| Polymer Chemistry | Tensile Modulus (MPa) | Tensile Yield Strength (MPa) | Tensile Yield Elongation (%) | Shore A Hardness |
| Example 1 | 10 | 8 | 125 | A60 |

Depending on the requirements for external UV exposure resistance performance, the formulation may optionally contain UV additives (e.g. Titanium Dioxide) to reduce PVC polymer degradation. Depending on the finished polymer coating weight, polymer element density, and polymer element height, the formulation may be modified to alter the resulting hardness and tensile yield strength for optimum skid resistance performance.

The underlayment layers may optionally contain additives for UV protection due to extended UV exposure. The layers are preferably light in color (or highly reflective vs. black asphalt felt paper) to reduce heat absorption which facilitates lower working surface temperatures and cooler roof systems.

Example 2

Self Adhesive Bituminous Roofing Underlayment

The same roofing underlayment of Example 1 was coated and laminated to a 1 mm thick layer of self adhesive bitumen (self adhesive bitumen formulations are known in the art, generally comprised of SBS polymer and bitumen), thus forming the top side layer. A siliconized PP release film liner was further applied to the exposed side of the self adhesive bitumen, thus forming the bottom side layer. The resulting roof underlayment possessed a breathability of 0.05 US PERMS (ASTM E96A, 23C/50% RH). This self adhered underlayment membrane was then adhered to the wooden deck and tested for skid resistance as per Example 1. The walking skid resistance and roof loading performance testing results were excellent.

Example 3

Mechanically Attached, Breathable Roofing Underlayment

The skid resistant nonwoven carrier sheet of Example 1 was simultaneously ultrasonically bonded to a 25 gsm LDPE microporous breathable film (Tredegar Film Products) comprising the inner layer, and to a 150 gsm nonwoven PP reinforcing lower layer. The resulting roofing underlayment possessed a breathability of 35 US PERMS (ASTM E96A, 23C/50% RH), and is considered breathable. This breathable roofing underlayment was mechanically attached to the test roof deck, and tested for skid resistance as per Example 1, and produced excellent results.

It is to be understood by one of ordinary skill in the art that the present discussion is a description of exemplary embodiments only, and is not intended to limit the broader aspects of the present invention.

Although various preferred embodiments of the present invention have been described herein in detail, it will be appreciated by those skilled in the art, that variations may be made thereto without departing from the spirit of the invention or the scope of the appended claims.

The invention claimed is:

1. A waterproofing roofing membrane, said membrane fabricated from one or more layers of flexible sheet material including a carrier sheet comprising a breathable, woven or non-woven fibrous material having a top surface and a bottom surface and a plurality of spaced-apart, discontinuous, raised polymer elements made from a plasticized polyvinyl chloride deposited in a skid resistant pattern into said carrier sheet with said polyvinyl chloride thereafter curing around individual fibers thereof and thereby becoming mechanically affixed into said carrier sheet, wherein said polymer elements have a tensile modulus of <15 MPa (ASTM D638, 23C, 50 mm/min), a tensile yield Elongation of >50% (ASTM D638, 23C, 50 mm/min), and a Shore A Hardness of <90 (ASTM D2240, 23C, 0 sec).

2. A waterproofing roofing membrane according to claim 1 wherein said carrier sheet is comprised of woven or non-woven materials selected from the group consisting of synthetic polymers of polyethylene, polypropylene, polyethylene terephthalate, and nylon, or blends and copolymers thereof; or glass or cotton, or blends thereof.

3. A waterproofing roofing membrane according to claim 1 wherein the height of the raised polymer elements is between 0.02 mm to 1.0 mm.

4. A waterproofing roofing membrane according to claim 1 wherein said polymer elements have a Tensile Modulus <7 MPa (ASTM D638, 23C, 50 mm/min), a Tensile Yield Elongation >50% (ASTM D638, 23C, 50 mm/min), and a Shore A Hardness (ASTM D2240, 23C, 0 sec)<75.

5. A waterproofing roofing membrane according to claim 1 wherein the pattern of polymer elements is comprised of distinct polymer regions having a density range of between 25 per 100 $cm^2$ to 2500 per 100 $cm^2$.

6. A waterproofing roofing membrane according to claim 1 wherein said polyvinyl chloride and plasticizer are formulated in a one-to-one ratio.

7. A waterproofing roofing membrane according to claim 1 wherein said carrier sheet bottom surface is attached to a non-breathable layer of flexible sheet material and thereby forming a non-breathable waterproofing roofing membrane.

8. A waterproofing roofing membrane according to claim 7 wherein said carrier sheet is comprised of woven or non-woven materials selected from the group consisting of synthetic polymers of polyethylene, polypropylene, polyethylene terephthalate, and nylon, or blends and copolymers thereof; or glass or cotton, or blends thereof.

9. A waterproofing roofing membrane according to claim 1 wherein said one or more flexible sheets of material forming the membrane are selected from one or more of the group consisting of woven or nonwoven synthetic polymers of polyethylene, polypropylene, polyethylene terephthalate and nylon, or blends and copolymers thereof; metal, woven or nonwoven glass, and bituminous materials.

10. A waterproofing roofing membrane according to claim 7 wherein said carrier sheet is attached to the membrane layer by means of adhesive, ultrasonic, mechanical, or thermal bonding, or polymeric coating.

11. A waterproofing roofing membrane according to claim 1 wherein said pattern of polymer elements has a Coefficient of Friction (COF) >0.5 when tested under horizontal plane, saturated wet conditions as measured by an English XL VIT.

12. A waterproofing roofing membrane according to claim 11 wherein the plurality of polymer elements has a surface application weight of between 5 grams/M2 and 50 grams/M2.

13. A waterproofing roofing membrane according to claim 1 having an exposed top surface solar reflectance >25% at 500 nm wavelength, as measured by ASTM E903-96 on a black background.

14. A waterproofing roofing membrane according to claim 1 wherein said membrane is fabricated from one or more reinforced flexible sheets of material.

15. A waterproofing roofing membrane according to claim 1 wherein a coating layer comprised of high COF (>0.5), as measured in dry conditions by an English XL VIT) PP, PE, EVA, EMA, other olefinic polymer or copolymers and blends thereof, is extrusion coated to the bottom surface of the membrane.

16. A waterproofing roofing membrane according to claim 15 where the woven or non-woven carrier sheet is attached to a reinforcing structural layer.

17. A waterproofing roofing membrane according to claim 16 where said reinforcing structural layer is comprised of one or more layers of woven or non-woven polypropylene, polyethylene, glass, nylon, polyethyleneterephthalate, metallic, or cotton fiber woven reinforcement or combination of any of them.

18. A waterproofing roofing membrane according to claim 16 where said reinforcing structural layer is comprised of multiaxially oriented polypropylene, polyethylene, polyethyleneterephthalate, polyvinyl chloride, sheets or films, and blends and copolymers thereof.

19. A waterproofing roofing membrane fabricated from one or more layers of polypropylene and having a top surface and a bottom surface, and wherein a plurality of raised, discontinuous polymer elements are deposited in a skid resistant pattern on and mechanically affixed into a breathable nonwoven fibrous polyester carrier sheet which is attached to the top surface of the membrane, wherein said polymer elements are made from a polymer material containing plasticized polyvinyl chloride, wherein the height of the polymer elements is 0.02 mm and have a density of 800 per 100 cm$^2$, wherein said polymer elements have a Tensile Modulus of <15 MPa (ASTM D638, 23C, 50 mm/min), a Tensile Yield Elongation of >50% (ASTM D638, 23C, 50 mm/min), and a Shore A Hardness of <90 (ASTM D2240, 23C, 0 sec).

20. A method of depositing and affixing a plurality of discontinuous raised polymer elements made from a polymer material containing plasticized polyvinyl chloride to a waterproofing roofing membrane fabricated from one or more layers of flexible sheet material wherein the height of the polymer elements is between 0.02 mm to 1.0 mm and said membrane has a breathable, woven or non-woven fibrous top surface, wherein an ambient temperature liquid and solid polymer formulation containing polyvinyl chloride, is deposited at ambient temperature as an unsolidified liquid pattern in a skid resistant pattern on the woven or non-woven top surface of said waterproofing membrane and allowed to flow down and into and around individual fibers, then the unsolidified liquid pattern on the waterproofing membrane is cured at an elevated temperature to mechanically affix said polymer elements into and around said individual fibers below the top surface of the membrane, wherein said polymer elements have a Tensile Modulus of <15 MPa (ASTM D638, 23C, 50 mm/min), a Tensile Yield Elongation of >50% (ASTM D638, 23C, 50 mm/min), and a Shore A Hardness of <90 (ASTM D2240, 23C, 0 sec).

21. A method according to claim 20 wherein the plurality of polymer elements is applied by a rotary screen transfer roll.

22. A method of depositing on and mechanically affixing a plurality of raised, discontinuous polymer elements having a height of between 0.02 mm to 1.0 mm and in the form of an ambient temperature, liquid and solid polymer formulation containing plasticized polyvinyl chloride to a waterproofing roofing membrane fabricated from one or more layers of flexible sheet material, wherein the polymer elements are first deposited on as an unsolidified liquid pattern in a skid resistant pattern to a carrier sheet of breathable, woven tape or non woven fibrous polypropylene (PP) or polyethylene terephthalate (PET), then the unsolidified liquid pattern on the carrier sheet is cured at an elevated temperature to mechanically affix said polymer elements into and around the fibers of the carrier sheet and then the carrier sheet is attached to the waterproofing membrane top layer of the one or more layers of flexible sheet material selected from one or more of the group consisting of synthetic polymers of polyethylene, polypropylene, polyethyleneterephthalate and nylon, or blends and copolymers thereof; metal, woven or non woven glass, and bituminous materials, wherein said polymer elements have a Tensile Modulus of <15 MPa (ASTM D638, 23C, 50 mm/min), a Tensile Yield Elongation of >50% (ASTM D638, 23C, 50 mm/min), and a Shore A Hardness of <90 (ASTM D2240, 23C, 0 sec).

23. A method according to claim 22 wherein the plurality of polymer elements are applied by a rotary screen transfer roll.

24. A method according to claim 23 wherein the carrier sheet is reinforced with a woven or non woven reinforcement layer comprised of woven, non woven, multi-axially oriented or extruded film of polypropylene, polyethylene, glass, nylon, polyethylene terephthalate, metallic, or cotton fiber reinforcement or combination of any of them before the carrier sheet is attached to the waterproofing membrane.

25. A method according to claim 23 wherein the one or more layers of flexible sheet material forming the waterproofing roofing membrane are polypropylene (PP).

26. A method according to claim 20 wherein the liquid polymer formulation to be applied as an unsolidified liquid pattern contains polyvinyl chloride resin, a plasticizer, calcium carbonate, an epoxidised oil and a stabilizer, mixed to uniformity.

27. A waterproofing roofing membrane fabricated from one or more layers of flexible sheet material and said membrane having a breathable, woven or non-woven fibrous top surface and a bottom surface and a plurality of spaced-apart, discontinuous, raised polymer elements made from plasticized polyvinyl chloride deposited in a skid resistant pattern on and mechanically affixed into and around said fibers of the woven or non-woven top surface of the membrane wherein the pattern of polymer elements is comprised of distinct polymer regions having a density range of between 25 per 100 cm$^2$ to 2500 cm$^2$, wherein said polymer elements have a Tensile Modulus of <15 MPa (ASTM D638, 23C, 50 mm/min), a Tensile Yield Elongation of >50% (ASTM D638, 23C, 50 mm/min), and a Shore A Hardness of <90 (ASTM D2240, 23C, 0 sec).

28. A waterproofing roofing membrane, said membrane fabricated from one or more layers of flexible sheet material and said membrane having a breathable, woven or non-woven fibrous top surface and a bottom surface and a plurality of spaced-apart, discontinuous, raised polymer elements made from plasticized polyvinyl chloride deposited in a skid resistant pattern on and mechanically affixed into and around said fibers of the woven or non-woven top surface of the membrane wherein the height of the raised polymer elements is at least 0.02 mm, wherein said polymer elements have a Tensile Modulus of <15 MPa (ASTM D638, 23C, 50 mm/min), a Tensile Yield Elongation of >50% (ASTM D638, 23C, 50 mm/min, and a Shore A Hardness of <90 (ASTM D2240, 23C, 0 sec).

29. The waterproofing roofing membrane according to claim 1 wherein said carrier sheet has a moisture vapour permeability of 35 US Perms (ASTM E96A, 23C/50% RH).

30. The waterproofing roofing membrane according to claim 1 wherein said carrier sheet is attached to a breathable layer to form a breathable waterproofing roofing membrane.

31. A waterproofing roofing membrane, said membrane fabricated from one or more layers of flexible sheet material including a carrier sheet comprising a breathable, woven or non-woven fibrous material having a top surface and a bottom surface and a plurality of spaced-apart, discontinuous, raised polymer elements made from a plasticized polyvinyl chloride comprising 100 parts PVC resin and 100 parts DINP plasticizer deposited in liquid form in a skid resistant pattern into said carrier sheet with said polyvinyl chloride thereafter curing around individual fibers thereof and thereby becoming mechanically affixed into said carrier sheet, wherein the height of the raised polymer elements are between about 0.02 mm and 1.0 mm and the spacing of the raised polymer elements is between about 25 per 100 $cm^2$ to 2500 $cm^2$.

32. The waterproofing roofing membrane according to claim 31 wherein the liquid polymer formulation to be applied as an unsolidified liquid pattern further contains calcium carbonate, an epoxidised oil and a stabilizer.

33. The waterproofing roofing membrane according to claim 32 wherein the cured polymer elements have a tensile modulus of about 10 MPa, a tensile yield strength of about 8 MPa, a tensile yield elongation of about 125% and a Shore A Hardness of about A60.

34. A waterproofing roofing membrane, said membrane fabricated from one or more layers of flexible sheet material including a carrier sheet comprising a breathable, woven or non-woven fibrous material having a top surface and a bottom surface and a plurality of spaced-apart, discontinuous, raised polymer elements made from a plasticized polyvinyl chloride comprising PVC resin and plasticizer mixed to uniformity and deposited in liquid form in a skid resistant pattern into said carrier sheet with said polyvinyl chloride thereafter curing around individual fibers thereof and thereby becoming mechanically affixed into said carrier sheet, wherein the cured polymer elements have a tensile modulus of about 10 MPa, a tensile yield strength of about 8 MPa, a tensile yield elongation of about 125% and a Shore A Hardness of about A60.

35. A waterproofing roofing membrane, said membrane fabricated from one or more layers of flexible sheet material including a carrier sheet comprising a breathable, woven or non-woven fibrous material having a top surface and a bottom surface and a plurality of spaced-apart, discontinuous, raised polymer elements made from a plasticized polyvinyl chloride comprising about 100 parts PVC resin and between about 40 parts and 100 parts plasticizer mixed and deposited in liquid form in a skid resistant pattern into said carrier sheet with said polyvinyl chloride thereafter curing around individual fibers thereof and thereby becoming mechanically affixed into said carrier sheet.

* * * * *